(12) United States Patent
Seinturier et al.

(10) Patent No.: US 10,953,981 B2
(45) Date of Patent: Mar. 23, 2021

(54) HELICOPTER EQUIPPED WITH A DEVICE FOR EMERGENCY LIFT ASSISTANCE

(71) Applicant: SAFRAN HELICOPTER ENGINES, Bordes (FR)

(72) Inventors: Eric Pierre Seinturier, Moissy-Cramayel (FR); Romain Thiriet, Moissy-Cramayel (FR); Fabien Mercier-Calvairac, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 298 days.

(21) Appl. No.: 15/756,018

(22) PCT Filed: Sep. 2, 2016

(86) PCT No.: PCT/FR2016/052182
§ 371 (c)(1),
(2) Date: Feb. 27, 2018

(87) PCT Pub. No.: WO2017/037401
PCT Pub. Date: Mar. 9, 2017

(65) Prior Publication Data
US 2018/0251213 A1 Sep. 6, 2018

(30) Foreign Application Priority Data
Sep. 4, 2015 (FR) ...................................... 1558230

(51) Int. Cl.
*B64C 27/06* (2006.01)
*B64C 27/00* (2006.01)
(Continued)

(52) U.S. Cl.
CPC ............ *B64C 27/006* (2013.01); *B64C 15/14* (2013.01); *B64C 27/06* (2013.01); *B64C 29/0041* (2013.01)

(58) Field of Classification Search
CPC .............................. B64C 27/006; B64C 15/14
See application file for complete search history.

(56) References Cited

U.S. PATENT DOCUMENTS 4,473,199 A * 9/1984 Magill .................... B64C 27/06
244/17.11
4,676,457 A * 6/1987 Allen ....................... B64D 1/14
244/139
(Continued)

FOREIGN PATENT DOCUMENTS

EP          1160159        12/2001

OTHER PUBLICATIONS

"Written Opinion," PCT Application No. PCT/FR2016/052182 (dated Dec. 15, 2016).

*Primary Examiner* — Philip J Bonzell
*Assistant Examiner* — Tye William Abell
(74) *Attorney, Agent, or Firm* — Womble Bond Dickinson (US) LLP

(57) ABSTRACT

The invention relates to a helicopter including a structural framework, at least one main rotor for lift and propulsion integral with said structural framework and a drive train for driving said main rotor including a power transmission gearbox and at least one main engine, wherein it further includes a plurality of extra booster power units fixed to said structural framework and configured so as to be able to supply extra lift of the helicopter in case of failure of the helicopter's drive train.

9 Claims, 1 Drawing Sheet

Figure 1:
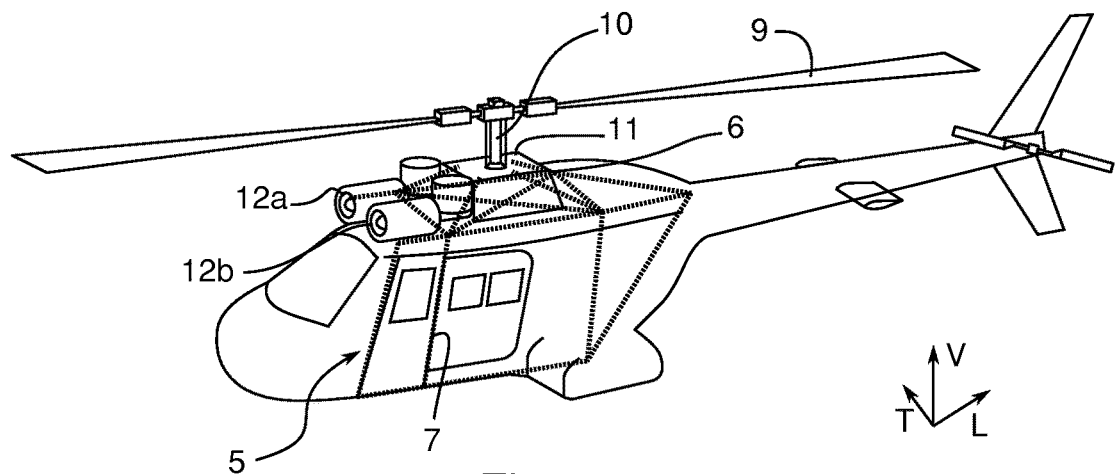

(51) Int. Cl.
*B64C 15/14* (2006.01)
*B64C 29/00* (2006.01)

(56) References Cited

U.S. PATENT DOCUMENTS

| | | | |
|---|---|---|---|
| 8,074,919 B1* | 12/2011 | Kulesha | B64C 27/32 244/17.15 |
| 2002/0030136 A1* | 3/2002 | Chiu | B64C 27/006 244/17.15 |
| 2009/0008510 A1* | 1/2009 | Posva | B64C 27/28 244/7 R |

* cited by examiner

HELICOPTER EQUIPPED WITH A DEVICE FOR EMERGENCY LIFT ASSISTANCE

1. TECHNICAL FIELD OF THE INVENTION

The invention relates to helicopters, in particular helicopters equipped with devices for emergency lift assistance in case of failure of a main engine.

2. TECHNOLOGICAL BACKGROUND

A helicopter conventionally comprises a main rotor for lift and propulsion forming a rotating wing, driven by a drive train comprising a main transmission gearbox and at least one main engine, such as a turbo-engine. The purpose of the main transmission gearbox of the helicopter is notably to transmit the lift forces of the rotor to the whole structure of the helicopter. A helicopter also comprises an anti-torque means, which is often formed by a second rotor, the tail rotor, coupled to the drive train.

There are single-engine helicopters, i.e. helicopters whose drive train only comprises a single engine. There are also multi-engine helicopters, in particular twin-engine or triple-engine helicopters, i.e. helicopters whose drive train comprises several engines.

Regardless of the type of helicopter in question (single-engine or multi-engine), failure of an engine of the drive train reduces the power supplied by the drive train to the main rotor for lift and propulsion of the helicopter, which may have disastrous consequences for the helicopter and its passengers.

For example, in the case of a single-engine helicopter, a loss of power of the main engine requires the pilot to undertake a tricky manoeuvre of autorotation for an emergency landing. The statistics show that in certain conditions this manoeuvre may lead to a "hard" landing, causing serious damage to the helicopter.

It has therefore been proposed, notably by the applicant, to install a means on the helicopter capable of supplying additional power very quickly, to ensure a safe manoeuvre of autorotation of a single-engine helicopter by preventing a drop in rotor speed in any of the phases of this manoeuvre.

In the case of a multi-engine helicopter, various solutions have also been proposed, notably by the applicant, for supplying a surplus of power allowing sufficient power to be maintained at the level of the helicopter rotor. For example, one of the solutions proposed consists of injecting fluid in the working turbines to increase their power temporarily and thus overcome the loss or failure of an engine. Another solution consists of mechanical assistance for the working turbines by supplying mechanical power to the gas generator of this working turbine. Another solution consists of supplying a surplus of power directly to the helicopter rotor or to the main transmission gearbox of the drive train.

All the solutions proposed, for single-engine or multi-engine applications, aim to supply a surplus of power to the helicopter's drive train for finally supplying a surplus of power at the level of the main rotor, which makes it possible to limit the drop in rotor speed, and thus maintain sufficient lift to keep the helicopter flying or at least reduce the speed at which the helicopter descends.

One of the drawbacks shared by these various solutions is that a failure in the kinematic chain of the main rotor (main transmission gearbox, rotor, pitch control, tail rotor, etc.) for lift cannot be compensated by supplying power. Therefore none of the proposed solutions makes it possible to overcome a failure in the kinematic chain of the main rotor.

Furthermore, in the case of a multi-engine helicopter, it is necessary to oversize the turbo-engines so as to be able to keep the helicopter flying in case of failure of one of the engines. These oversized turbo-engines are detrimental in terms of weight and fuel consumption.

Moreover, it has been proposed, in document U.S. Pat. No. 4,676,457 A, to equip the helicopter with propulsion units incorporated in the fuselage in order to limit the speed of descent. However, with regard to the solution of equipping the helicopter with additional devices so as to be able to supply a surplus of propulsive power if needed, this requires a more complex architecture of the helicopter and of the drive train, making the helicopter even heavier, which is also detrimental in terms of weight and fuel consumption.

The applicant has therefore sought a novel solution that overcomes the drawbacks of the known solutions.

3. OBJECTIVES OF THE INVENTION

The invention aims to supply a helicopter that is able to generate extra vertical thrust without imposing stresses on the helicopter's drive train.

The invention also aims to supply, in at least one embodiment of the invention, a surplus of power in case of engine failure, independently of the helicopter's drive train.

The invention also aims to supply, in at least one embodiment of the invention, a helicopter that is able to maintain a certain level of lift, including in case of failure of the main rotor for lift.

The invention also aims to supply, in at least one embodiment of the invention, a helicopter of this kind that does not have detrimental features in terms of weight or fuel consumption.

4. DESCRIPTION OF THE INVENTION

For this purpose, the invention relates to a helicopter comprising a structural framework, at least one main rotor for lift and propulsion integral with said structural framework and a drive train for driving said main rotor comprising a power transmission gearbox and at least one main engine.

A helicopter according to the invention further comprises a plurality of extra booster power units fixed to said structural framework and configured so as to be able to supply extra lift of the helicopter in case of failure of the helicopter's drive train.

A helicopter according to the invention is characterised in that each booster power unit is mounted detachably on the structural framework.

This extra lift can notably make up for a lack of power of the drive train in a critical situation.

Throughout the text, the structural framework of the helicopter denotes the rigid structure formed from rigid members such as frames, cross-beams, pillars, boxes, arches, plates, etc., assembled together to form the airframe of the helicopter.

A helicopter according to the invention can therefore make up for any failure of its drive train (power transmission gearbox, engine, rotor, etc.) and maintain a certain level of lift by the application of extra booster power units fixed to the structural framework of the helicopter. In other words, a helicopter according to the invention is able to generate extra vertical thrust, if needed, without involving the helicopter's rotor for lift and propulsion. The extra booster power units of a helicopter according to the invention form a device for emergency lift assistance of the helicopter.

As the extra booster power units are independent of the drive train, they are not very intrusive, and do not alter the behaviour of the helicopter in normal situations. Moreover, they do not require a design change of a helicopter.

A helicopter according to the invention also allows the extra booster power units to be fitted only when necessary. In particular, it is then possible for the extra booster power units to equip different helicopters. It is for example possible to have several extra booster power units intended to equip a plurality of helicopters of a helicopter fleet. For each mission, the extra booster power units are mounted on the helicopter from the fleet selected for this mission. For a subsequent mission, if another helicopter is selected, the same power units may then be dismounted from the first helicopter and mounted on the newly selected helicopter.

A helicopter according to the invention offers improved safety relative to the known helicopters.

Furthermore, in the case of a multi-engine helicopter, the invention means that it is no longer necessary to oversize the engines to make up for possible failure of a turbo-engine. The specific consumption of the main engines is therefore improved.

Advantageously, according to the invention, the structural framework comprises upper frames arranged in the vicinity of the main rotor for lift and propulsion, and the extra booster power units are fixed on these upper frames.

According to this advantageous embodiment, the extra booster power units are fixed on upper frames of the structural framework arranged in the vicinity of the main rotor. These upper frames transmit the vertical lift forces to the airframe of the helicopter. The arrangement of the power units at the level of the upper part of the structural framework of the helicopter makes it possible to limit the risks of rolling or of loss of control on activation of the power units.

Advantageously, according to the invention, the extra booster power units comprise pyrotechnic devices.

According to this advantageous embodiment, the power units employ pyrotechnic devices. These pyrotechnic devices allow thrust to be generated very quickly without taking up a lot of space. These pyrotechnic devices comprise for example a solid propellant gas generator, a device for igniting the solid propellant, controlled electrically and connected to a computer for triggering the ignition device, and a discharge nozzle for the gases.

Advantageously, according to the invention, the extra booster power units are configured to make it possible for each to supply identical propulsive power and they are arranged and oriented on the structural framework in such a way that they exert thrust forces in directions intersecting at a single point, called the convergence point.

Advantageously, according to this variant, the convergence point is arranged at the centre of the rotor in the plane of the rotor blades, in such a way that the resultant of the thrust forces of the extra booster power units is vertical, and applied at the top of a rotor mast.

This arrangement and orientation of the power units make it possible to generate a vertical resultant of the thrust forces. Furthermore, the torque applied to the structural framework is zero at the convergence point, which eliminates the risks of inducing rotation of the helicopter owing to the power units.

Advantageously, according to the invention, the convergence point is the centre of gravity of the helicopter.

Advantageously, a helicopter according to the invention further comprises a control unit connected to each booster power unit and configured for controlling the activation of each booster power unit in case of a failure in the helicopter's drive train.

This control unit is, for example, an electronic computer for controlling the helicopter (better known by the English acronym EECU). This computer is for example integrated with the device controlling the turbo-engines, known by the English acronym FADEC, for Full Authority Digital Engine Control. The control unit may also be connected to devices for detecting the altitude of the helicopter, such as an altimeter, for automatic control of activation of the power units once a critical altitude is reached in conjunction with a failure detected on one of the turbo-engines of the helicopter. According to this variant, the control unit is configured so as to be able to activate the extra booster power units automatically as the ground is approached.

According to an advantageous variant of the invention, the helicopter is equipped with four extra booster power units uniformly distributed on the structural framework.

The invention also relates to a helicopter characterised in combination by some or all of the features mentioned above or hereunder.

5. LIST OF FIGURES

Figure 2:
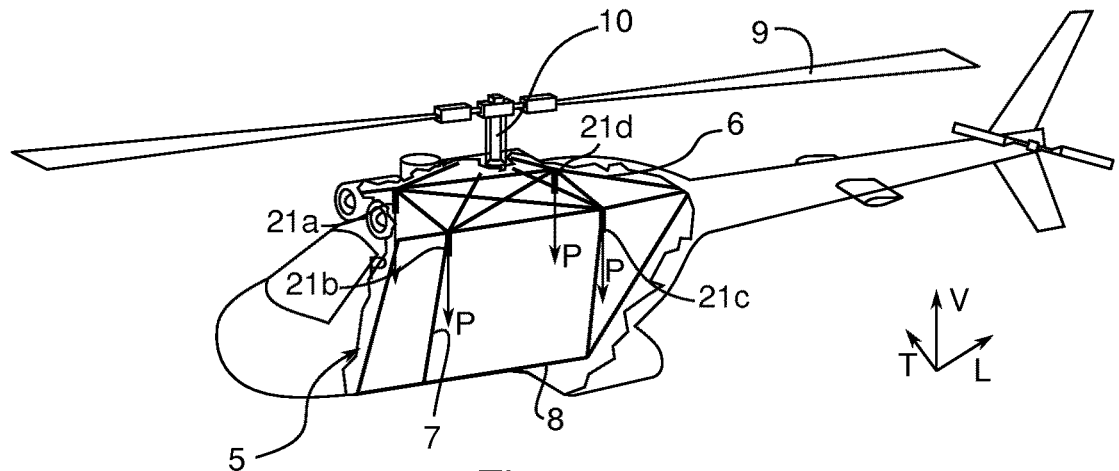
Figure 3:
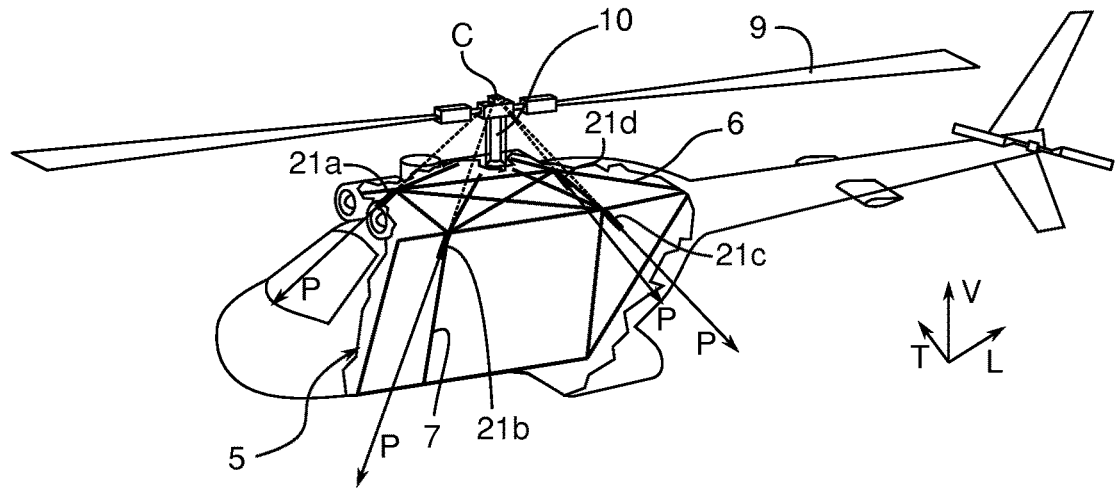

Other aims, features and advantages of the invention will become clear on reading the following description, given purely non-exhaustively, and referring to the appended figures, in which:

FIG. 1 is a schematic view of a helicopter intended to be equipped with a device for emergency lift assistance to form a helicopter according to one embodiment of the invention, FIG. 2 is a partially sectioned schematic view of a helicopter according to one embodiment of the invention FIG. 3 is a partially sectioned schematic view of a helicopter according to another embodiment of the invention.

6. DETAILED DESCRIPTION OF ONE EMBODIMENT OF THE INVENTION

In the drawings, scales and proportions are not strictly observed, for purposes of illustration and clarity. Throughout the following detailed description, with reference to the figures, unless stated otherwise, each element of the helicopter is described as it is arranged when the helicopter is horizontal. This arrangement is shown in FIGS. 1 to 3.

Furthermore, the identical, similar or analogous elements are denoted by the same references in all the figures. Finally, the terms longitudinal, transverse and vertical are used non-exhaustively with reference to the L, T, V axis system as shown in the figures. The longitudinal direction corresponds to the principal direction of the helicopter.

FIG. 1 shows a helicopter comprising a structural framework 5. This structural framework 5 is shown with dotted lines in FIG. 1. This framework forms the airframe of the helicopter and comprises upper frames 6, pillars 7, lower frames 8, cross-beams, etc., assembled together to form the airframe of the helicopter.

The helicopter also comprises a main rotor 10 for lift and propulsion integral with the structural framework 5. The rotor 10 is coupled to blades 9 for lift and propulsion. The helicopter also comprises a drive train for driving the main rotor 10. This drive train comprises a power transmission gearbox 11 and two main engines 12*a*, 12*b*.

FIG. 2 is a schematic view of a helicopter according to one embodiment of the invention obtained starting from the helicopter in FIG. 1. This view is sectioned to reveal the upper frames, pillars, lower frames, cross-beams, etc. of the structural framework 5. This helicopter comprises, in addition to the members and elements described in connection with FIG. 1, four extra booster power units 21a, 21b, 21c, 21d fixed on the upper frames 6 of the structural framework 5. Each power unit is configured so as to be able to supply, on command, extra lift of the helicopter in case of failure of a main engine 12a, 12b of the helicopter.

The power units are for example pyrotechnic rockets comprising a solid propellant gas generator, a device for igniting the solid propellant and a nozzle for discharge of the gases. Any other type of power unit may be used for implementing the invention.

Preferably, all the power units are identical and are configured so as to be able to supply the same power. They are fixed detachably on the upper frames 6 of the structural framework 5, for example by means of fixing collars equipped with a system of the screw-nut type. Furthermore, they are oriented downwards so that they exert a downward thrust force. The thrust produced by each power unit 21a, 21b, 21c, 21d is shown schematically in FIGS. 2 and 3 by an arrow with the reference letter P.

According to an advantageous embodiment, the supply of lift from each power unit is moderated. For this purpose, the power unit is configured so that the maximum power that it can produce is of the order of 20% of the maximum power of a main engine of the helicopter, and for a time of the order of 30 seconds. The power units are only intended to slow the descent of the helicopter for a brief moment, in the vicinity of the ground, and not to provide continuation of flight in case of failure of one or more main engines of the helicopter.

FIG. 3 is a schematic view of a helicopter according to another embodiment of the invention in which the extra booster power units 21a, 21b, 21c, 21d are arranged and oriented on the structural framework 5 in such a way that they exert thrust forces P in directions intersecting at a single point, called the convergence point. This point is referenced with the letter C in FIG. 3. The view in FIG. 3 is also sectioned to reveal the upper frames, pillars, lower frames, cross-beams, etc. of the structural framework 5. In the embodiment in FIG. 3, the convergence point C is arranged at the centre of the rotor 10 in the plane of the blades 9. According to this embodiment, the resultant of the thrust forces P of the extra booster power units 21a, 21b, 21c, 21d is vertical, which limits any risk of rolling and of rotation of the helicopter.

The activation of the power units can be controlled by a control unit connected to each booster power unit and configured for controlling the activation of each booster power unit in case of a failure in the helicopter's drive train.

This control unit may also be connected to a device for detecting the altitude of the helicopter such as an altimeter or any equivalent device. This control unit may also be controlled manually by the pilot during the mission if necessary, for example in case of emergency, to avoid an obstacle or take evasive action under enemy fire.

According to an advantageous embodiment, the thrust axis of the power units may be orientable using means of the nozzle or flap type, to ensure horizontal attitude of the helicopter.

The invention is not limited just to the embodiments described. The invention also applies to a single-engine helicopter. The invention may also comprise more (or fewer) than four extra booster power units for supplying emergency lift assistance.

Moreover, the detailed description describes power units fitted on the upper frames of the structural framework of the helicopter. According to other embodiments not shown, the power units may of course be arranged at any point of the structural framework, notably on the helicopter skids.

The invention claimed is:

1. A helicopter comprising
a structural framework,
at least one main rotor for lift and propulsion integral with said structural framework and
a drive train for driving said main rotor comprising
a power transmission gearbox and at least one main engine, further comprising
a plurality of extra booster power units fixed to said structural framework and configured so as to be able to supply extra lift of the helicopter in case of failure of the helicopter's drive train, wherein each of said extra booster power unit is mounted detachably on the structural framework and wherein the structural framework further comprises
upper frames arranged in the vicinity of the main rotor for lift and propulsion, and in that said extra booster power units are fixed on said upper frames.

2. The helicopter according to claim 1
wherein each of said extra booster power unit is mounted detachably on the structural framework by detachable fixing means.

3. The helicopter according to claim 1, wherein the helicopter comprises four extra booster power units uniformly distributed on said structural framework.

4. The helicopter according to claim 1, wherein said extra booster power units comprise pyrotechnic devices.

5. The helicopter according to claim 1, wherein the helicopter comprises a control unit connected to each of said extra booster power units and configured for controlling the activation of each of said extra booster power units in case of a failure in the helicopter's drive train.

6. The helicopter according to claim 5, wherein said control unit is configured so as to be able to activate the extra booster power units automatically as the ground is approached.

7. The helicopter according to claim 1, wherein said extra booster power units are configured so that each one is able to supply identical propulsive power and in that said extra booster power units are arranged and oriented on said structural framework in such a way that said extra booster power units exert thrust forces in directions intersecting at a single point, called the convergence point (C).

8. The helicopter according to claim 7, wherein said convergence point (C) is arranged at the centre of the rotor in the plane of the rotor blades, in such a way that the resultant of the thrust forces of the extra booster power units is vertical and is applied at the top of a rotor mast.

9. The helicopter according to claim 7, wherein said convergence point (C) is the centre of gravity of the helicopter.

* * * * *